United States Patent
Lee et al.

(10) Patent No.: US 10,399,874 B2
(45) Date of Patent: Sep. 3, 2019

(54) DRINKING WATER SUPPLY DEVICE AND METHOD OF CONTROLLING A DRINKING WATER SUPPLY DEVICE

(71) Applicant: LG ELECTRONICS INC., Seoul (KR)

(72) Inventors: Sangduck Lee, Seoul (KR); Kiwon Yu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 291 days.

(21) Appl. No.: 14/963,418

(22) Filed: Dec. 9, 2015

(65) Prior Publication Data
US 2016/0167990 A1  Jun. 16, 2016

(30) Foreign Application Priority Data

Dec. 11, 2014 (KR) .................. 10-2014-0178357
Jan. 16, 2015 (KR) .................. 10-2015-0007890

(51) Int. Cl.
*C02F 1/68* (2006.01)
*C02F 1/00* (2006.01)

(52) U.S. Cl.
CPC ............. *C02F 1/686* (2013.01); *C02F 1/008* (2013.01); *C02F 1/003* (2013.01); *C02F 2209/005* (2013.01); *C02F 2209/40* (2013.01); *C02F 2307/10* (2013.01)

(58) Field of Classification Search
None
See application file for complete search history.

(56) References Cited

U.S. PATENT DOCUMENTS 3,375,913 A  4/1968 Norris, Jr.
3,442,800 A  5/1969 Jasionowski
(Continued)

FOREIGN PATENT DOCUMENTS

CN  1201925  12/1998
CN  1357489  7/2002
(Continued)

OTHER PUBLICATIONS

Korean Notice of Allowance dated Sep. 22, 2016 issued in Application No. 10-2015-0012623.
(Continued)

*Primary Examiner* — Richard C Gurtowski
(74) *Attorney, Agent, or Firm* — Ked & Associates, LLP

(57) ABSTRACT

A drinking water supply device may include a filtered water pipe, a flow rate sensor, a water supply pipe, a mineral supply pipe provided with a mineral supply valve, a mineral cartridge configured to connect to the mineral supply pipe, a mineral mixer configured to connect to the water supply pipe and the mineral supply pipe and configured to allow mixing of the minerals from the mineral supply pipe with the filtered water in the water supply pipe, a pump, a discharge pipe configured to connect to the mineral mixer and the water supply pipe, and a controller configured to control an output voltage of the pump in order to adjust an amount of minerals that are supplied to the water supply pipe based on a flow rate sensed by the flow rate sensor.

11 Claims, 10 Drawing Sheets

(56) References Cited

U.S. PATENT DOCUMENTS

| | | | | |
|---|---|---|---|---|
| 3,785,492 | A * | 1/1974 | Mazza | B67D 1/0406 210/149 |
| 5,427,682 | A | 6/1995 | Vogel et al. | |
| 5,443,739 | A * | 8/1995 | Vogel | B01D 61/08 210/257.2 |
| 8,478,540 | B2 | 7/2013 | Uen et al. | |
| 8,515,574 | B2 | 8/2013 | Studor et al. | |
| 8,893,927 | B2 | 11/2014 | Olson et al. | |
| 2003/0234212 | A1* | 12/2003 | Ito | C02F 1/46114 210/85 |
| 2006/0070936 | A1 | 4/2006 | Kato et al. | |
| 2006/0191785 | A1* | 8/2006 | Ito | C02F 1/461 204/228.6 |
| 2007/0199582 | A1 | 8/2007 | Kroon | |
| 2012/0055857 | A1 | 3/2012 | Marin et al. | |
| 2012/0285897 | A1 | 11/2012 | Fike et al. | |
| 2015/0059807 | A1 | 3/2015 | Behle et al. | |

FOREIGN PATENT DOCUMENTS

| | | |
|---|---|---|
| CN | 101007661 | 8/2007 |
| CN | 101193825 | 6/2008 |
| CN | 201280452 | 7/2009 |
| CN | 102107941 | 6/2011 |
| CN | 102307639 | 1/2012 |
| CN | 102961050 | 3/2013 |
| CN | 203279755 | 11/2013 |
| CN | 103596473 | 2/2014 |
| CN | 103844897 | 6/2014 |
| CN | 103960983 | 8/2014 |
| JP | H06-10198 | 2/1994 |
| JP | H 06-182360 | 7/1994 |
| JP | 08-071571 | 3/1996 |
| JP | 11-244895 | 9/1999 |
| JP | 2000-254664 | 9/2000 |
| JP | 2000-357269 A | 12/2000 |
| JP | 2006-198555 | 8/2006 |
| JP | 2007-229293 | 9/2007 |
| JP | 2008-239166 | 10/2008 |
| JP | 2011-522568 | 8/2011 |
| JP | 50-34592 | 9/2012 |
| JP | 2015-500206 | 1/2015 |
| KR | 10-0032724 | 3/1986 |
| KR | 20-0197709 | 9/2000 |
| KR | 10-2003-0037237 | 5/2003 |
| KR | 20-0396242 | 9/2005 |
| KR | 10-0727676 | 6/2007 |
| KR | 10-0890213 | 3/2009 |
| KR | 10-2010-0076350 | 7/2010 |
| KR | 10-2012-0079002 | 7/2012 |
| KR | 10-2013-0062010 | 6/2013 |

OTHER PUBLICATIONS

Korean Notice of Allowance dated Apr. 26, 2016 issued in Application No. 10-2015-0007890 (with English Translation).
Korean Notice of Allowance dated May 4, 2016 issued in Application No. 10-2015-0012622 (with English Translation).
Korean Notice of Allowance dated May 18, 2016 issued in Application No. 10-2014-0178357 (with English Translation).
U.S. Appl. No. 14/963,327, filed Dec. 9, 2015.
U.S. Appl. No. 14/963,353, filed Dec. 9, 2015.
Chinese Office Action (with English Translation) dated Dec. 19, 2017 issued in Application No. 201510919930.1.
Chinese Office Action (with English Translation) dated Jan. 17, 2018 issued in Application No. 201510920076.0.
English Translation for JPH 06-182360 published Jul. 1994.
U.S. Office Action dated Mar. 8, 2018 issued in co-pending U.S. Appl. No. 14/963,327.
U.S. Office Action dated Mar. 8, 2018 issued in co-pending U.S. Appl. No. 14/963,353.
Chinese Office Action (with English Translation) dated Feb. 23, 2018 issued in Application No. 201510919830.9.

* cited by examiner

FIG. 3A
FIG. 3B
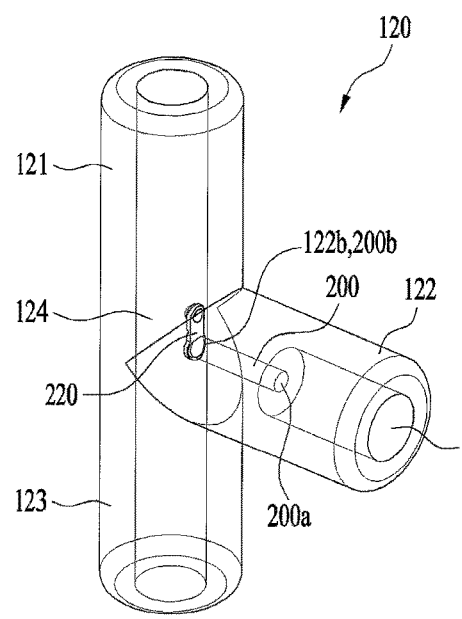
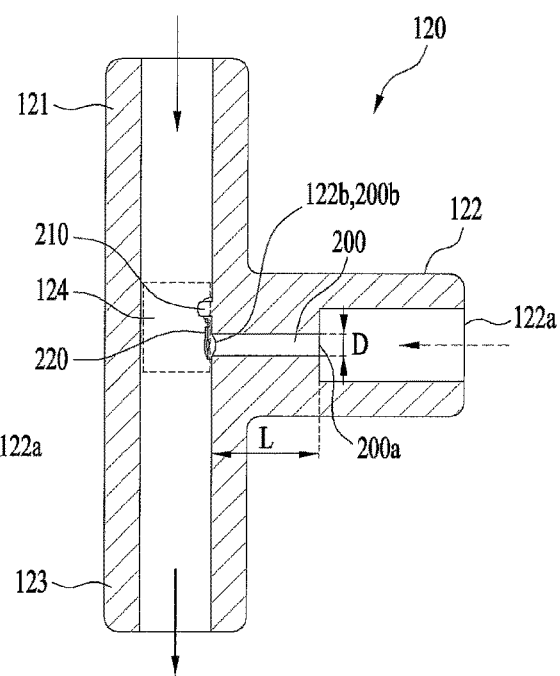

FIG. 7A
FIG. 7B
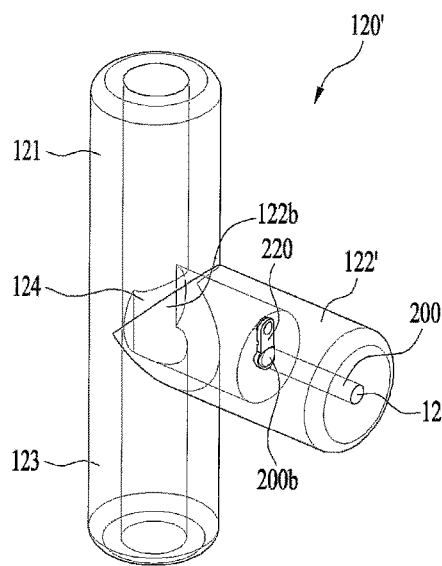
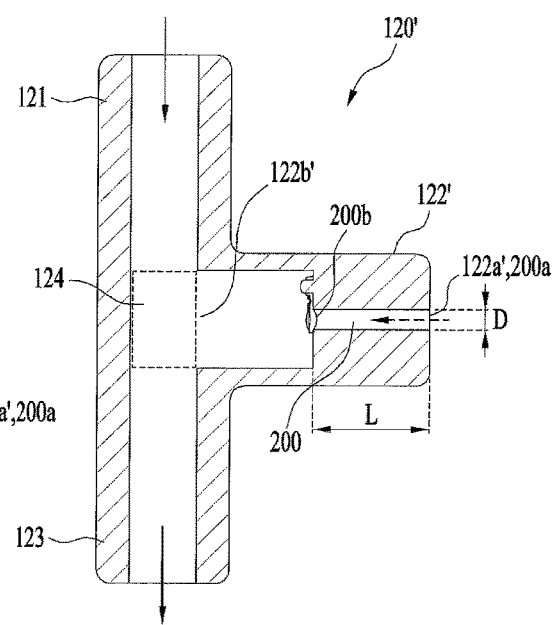

FIG. 9A

| FLOW RATE RANGE | PUMP VOLTAGE |
|---|---|
| A~B LPM | a V |
| B~C LPM | b V |
| C~D LPM | c V |
| N LPM | n V |

FIG. 9B

FIRST MINERAL CONTENT RANGE

| FLOW RATE RANGE | PUMP VOLTAGE |
|---|---|
| A~B LPM | a V |
| B~C LPM | b V |
| C~D LPM | c V |
| N LPM | n V |

SECOND MINERAL CONTENT RANGE

| FLOW RATE RANGE | PUMP VOLTAGE |
|---|---|
| A~B LPM | a' V |
| B~C LPM | b' V |
| C~D LPM | c' V |
| N LPM | n' V |

THIRD MINERAL CONTENT RANGE

| FLOW RATE RANGE | PUMP VOLTAGE |
|---|---|
| A~B LPM | a'' V |
| B~C LPM | b'' V |
| C~D LPM | c'' V |
| N LPM | n'' V |

N-TH MINERAL CONTENT RANGE

| FLOW RATE RANGE | PUMP VOLTAGE |
|---|---|
| A~B LPM | $a^n$ V |
| B~C LPM | $b^n$ V |
| C~D LPM | $c^n$ V |
| N LPM | $n^n$ V |

FIG. 9C

| MINERAL CONTENT RANGE | OPENING TIME OF MINERAL SUPPLY VALVE |
|---|---|
| A~B ppm | a sec |
| B~C ppm | b sec |
| C~D ppm | c sec |
| N ppm | n sec |

DRINKING WATER SUPPLY DEVICE AND METHOD OF CONTROLLING A DRINKING WATER SUPPLY DEVICE

CROSS-REFERENCE TO RELATED APPLICATIONS

This application claims priority under 35 U.S.C. § 119 to Korean Application Nos. 10-2014-0178357, filed on Dec. 11, 2014, and 10-2015-0007890, filed on Jan. 16, 2015, whose entire disclosures are incorporated herein by reference.

BACKGROUND

1. Field

A drinking water supply device capable of supplying mineral water and a method of controlling a drinking water supply device are disclosed herein.

2. Background

In general, a drinking water supply device may be a device that supplies drinking water to a user. The drinking water supply device may be a stand-alone device or may constitute part of an electric home appliance, such as, e.g., a refrigerator.

A drinking water supply device may supply drinking water at room temperature. The drinking water supply device may cool drinking water using a cold water supply unit that includes a refrigeration cycle or may heat drinking water using a hot water supply unit that includes a heater. That is, the drinking water supply device may supply cold water or hot water to a user as needed.

Drinking water may be underground water, raw water or natural water supplied from a faucet, or filtered water obtained by filtering raw water. Drinking water may be defined as drinkable water.

Drinking water supply devices may be capable of providing water other than filtered water, cold water, or hot water. For example, the drinking water supply device may include a mineral water supply module. The mineral water supply module may provide mineral water that may contain a predetermined amount of minerals to a user.

Minerals may constitute one of five types of nutritional substances along with protein, fat, carbohydrates, and vitamins. Minerals may play an important part in biochemical activity such as, e.g., catalytic activity, in the human body and in the constitution of, for example, the bones and teeth. Mineral elements such as calcium (Ca), potassium (K), magnesium (Mg), and sodium (Na) may be important for metabolism.

Mineral water that may contain these minerals may play a supporting role in improving health, for example, discharging waste matter from the human body and promoting digestion. When a predetermined amount of minerals are in drinking water, the water may taste better than when the user drinks filtered water.

To make mineral water in a drinking water supply device, mineral water supply modules, e.g., an electro-analyzer, a mineral filter, and/or a device for directly supplying condensed minerals to filtered water, may be applied to the drinking water supply device. The device for directly supplying condensed minerals to filtered water may be more compact than other mineral water supply modules.

For example, the mineral water supply module, which may directly supply condensed minerals to filtered water, may be configured to have a structure in which minerals discharged from a mineral cartridge or container in which condensed mineral liquid may be stored may be supplied to a water discharge pipe via a mineral supply pipe.

Conventional mineral water supply modules may have a mineral supply pipe with the same inner diameter as a water discharge pipe. As a result, the amount of minerals supplied may easily vary depending upon a pressure from a pump configured to pressurize the mineral supply pipe. That is, the amount of minerals discharged may change so that the variation in concentration of minerals in mineral water discharged may be high. Thus, the mineral water may taste differently every time a user drinks the water.

When filtered water is supplied after mineral water has been discharged, minerals remaining in the mineral supply pipe may be easily introduced into the filtered water. As a result, a large amount of minerals may be discharged so that the filtered water provided may taste different.

It may also be difficult to make mineral water containing a predetermined content of minerals depending upon the flow rate of filtered water or the content of minerals. Thus, mineral water may taste different depending upon the variation in amount of raw water used.

Water may also taste different depending upon the season and/or upon the region where the drinking water supply device may be installed, even if the same drinking water supply device may be used. That is, water may taste differently every time a user drinks the water so the user may not drink mineral water that has a uniform taste. Thus, the reliability of the drinking water supply device may be reduced.

BRIEF DESCRIPTION OF THE DRAWINGS

The embodiments will be described in detail with reference to the following drawings in which like reference numerals refer to like elements wherein:

FIG. 3A is a perspective view of a mineral mixer according to an embodiment;

FIG. 3B is a cross-sectional view of the mineral mixer of FIG. 3A showing a flow direction;

FIG. 7A is a perspective view of a mineral mixer according to another embodiment;

FIG. 7B is a cross-sectional view of the mineral mixer of FIG. 7A showing a flow direction;

FIGS. 9A, 9B, and 9C are data tables based on the flow rate of filtered water and/or the content of minerals that may be supplied to a mineral mixer according to an embodiment.

DETAILED DESCRIPTION

In the following description, water that has yet to pass through a filter will be defined as raw water, raw water that has passed through a filter will be defined as filtered water, and raw water containing minerals will be defined as mineral water. In addition, a rear end and a front end may mean an upstream side and a downstream side in a direction in which a fluid flows forward.

Figure 1:
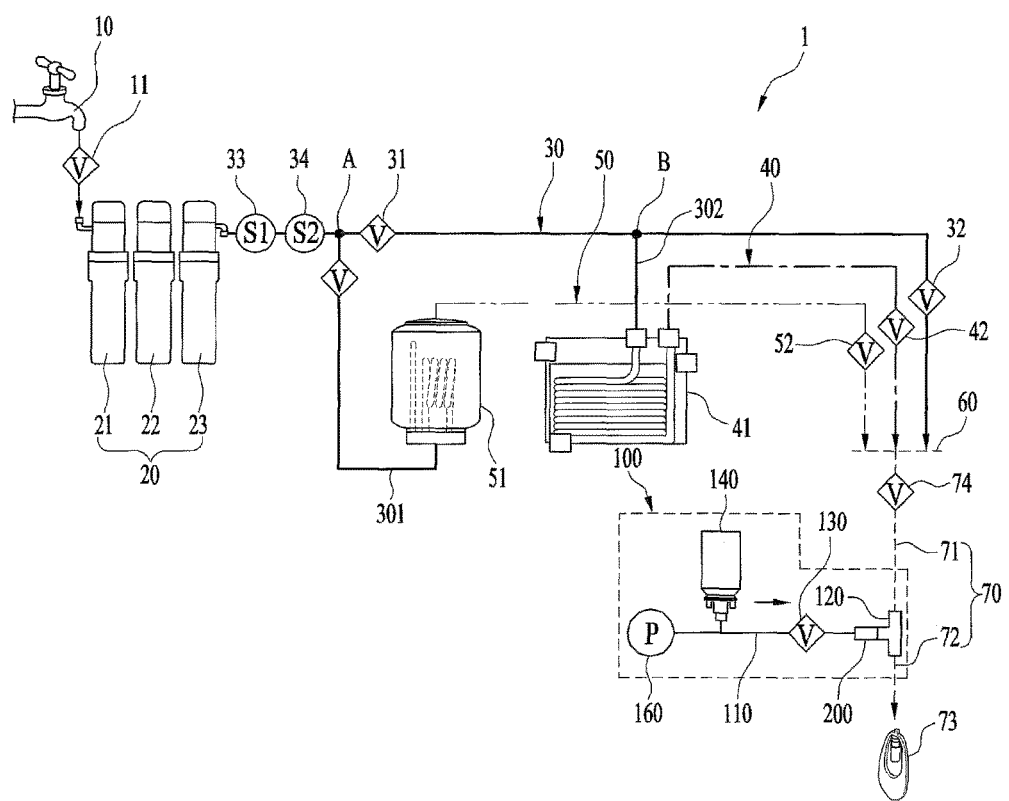
FIG. 1 is a conceptual view of a drinking water supply device according to an embodiment.

FIG. 1 is a conceptual view of a drinking water supply device according to an embodiment. Raw water may be introduced into the drinking water supply device 1 through an external water tap 10. The introduced raw water may be converted into filtered water using a filter unit 20.

The construction of the filter unit 20 may vary. A plurality of single filters may constitute the filter unit 20. As shown in FIG. 1, three filters that may be connected in series to one another may constitute the filter unit 20, but the embodiment is not limited thereto. For example, the filter unit 20 may include, e.g., a pre-carbon filter 21, an ultra-filtration (UF) filter 22, and a post-carbon filter 23.

The UF filter 22 may be a hollow fiber membrane filter. That is, the UF filter 22 may be a porous filter provided with pores that may have sizes ranging from tens to hundreds of nanometers (nm). The porous filter may remove contaminants in water through or via a plurality of micro pores distributed on the surface of the membrane.

The UF filter 22 may transmit or allow minerals to pass through while removing micro materials. A reverse osmosis (RO) filter that functions to remove contaminants in water may remove more than 95% of minerals as well as micro materials.

Filtered water that may be obtained by filtering raw water using the filter may contain a predetermined amount of minerals, which may vary depending upon the region or the season.

Filtered water that has passed through the filter unit 20 may be discharged out of the drinking water supply device 1 through a filtered water pipe 30, a filtered water supply valve 32, and a cock 73, for example.

According to an embodiment, the drinking water supply device 1 may supply cold water or hot water according to the demand of the user.

Heated filtered water or hot water may be discharged out, for example, through a first branch filtered water pipe 301 that may diverge from point A of the filtered water pipe 30, a heating unit 51, a hot water pipe 50, a hot water supply valve 52, and the cock 73.

Cooled filtered water or cold water may be discharged out, for example, through a second branch filtered water pipe 302 that may diverge from point B of the filtered water pipe 30, a cooling unit 41, a cold water pipe 40, a cold water supply valve 42, and the cock 73.

According to an embodiment shown in FIG. 1, filtered water, cold water, and hot water may be discharged through a single cock 73. Cocks for discharging the filtered water, the cold water, and the hot water may be provided separately. The filtered water and the cold water may be discharged through one cock, and the hot water may be discharged through another cock, but the embodiment is not limited thereto.

A cock valve 74 may be provided at a rear end of the filtered water supply valve 32, the cold water supply valve 42, and the hot water supply valve 52. The cock valve 74 may be connected to a distribution pipe 60. The distribution pipe 60 may be connected to the filtered water pipe 30, the cold water pipe 40, and the hot water pipe 50.

A water discharge pipe 70, through which filtered water, cold water, or hot water may be supplied, may be provided at the rear end of the cock valve 74. Filtered water, cold water, or hot water may be supplied into the distribution pipe 60, and, when the cock 73 is opened using the single cock valve 74, the filtered water, the cold water, or the hot water may be selectively supplied through the water discharge pipe 70.

FIG. 1 shows a drinking water supply device that may supply filtered water, cold water, and hot water, but the embodiments are not limited thereto. For example, the drinking water supply device may supply at least one selected from among filtered water, cold water, and hot water.

A mineral water supply module 100 for generating or making mineral water may be connected to the water discharge pipe 70. If the drinking water supply device supplies only filtered water or at least one selected from among filtered water, cold water, and hot water, the mineral water supply module 100 may be connected to the filtered water pipe 30.

The mineral water supply module 100 may be connected to a side of the water discharge pipe 70 via a mineral water generation unit or mineral mixer 120 that may be connected to the water discharge pipe 70.

A portion of the water discharge pipe 70 that connects to the mineral mixer 120 at a front end of the mineral mixer 120 will be referred to as a water supply pipe 71, and a portion of the water discharge pipe 70 connected to the mineral mixer 120 at a rear end of the mineral mixer 120 will be referred to as a discharge pipe 72, for the convenience of description.

The water supply pipe 71 may be a pipe through which filtered water, cold water, or hot water may be selectively discharged and introduced into the mineral mixer 120 when the cock 73 is opened by the single cock valve 74.

The discharge pipe 72 may be a pipe through which the filtered water, the cold water, or the hot water that has passed through the mineral mixer 120 or mineral water generated by the mineral mixer 120 may be selectively discharged to the cock 73.

According to an embodiment, a drinking water supply device 1 may include a flow rate sensor 34 configured to measure the flow rate of filtered water flowing in the filtered water pipe 30 or a mineral content sensing means or sensor configured to detect the mineral content of filtered water flowing in the filtered water pipe 30.

The mineral content sensing means may be a mineral sensor 33 that may be directly mounted in the filtered water pipe 30 and configured to detect minerals in filtered water. The mineral content sensing means may also be a value that may be predetermined or preset according to the region and season and may be stored in a controller 400. That is, the predetermined or set value stored in the controller 400 may be a value indicating the mineral content of raw water according to the region and season and may be investigated in advance. The predetermined or set value may be stored in the drinking water supply device 1 and may be selected, for example, by a user who may install, manage, or use the drinking water supply device 1.

Either the flow rate sensor 34 or the mineral sensor 33, or both, may be provided in the filtered water pipe 30. The flow rate may vary depending on an environment that the drinking water supply device may be placed. For example, the flow rate may vary depending on the amount of raw water that may be used, the water pressure, the region, or the season. In order to generate or make mineral water that has a uniform mineral content, both the flow rate sensor 34 and the mineral sensor 33 may be provided in the filtered water pipe 30.

The flow rate sensor 34 and the mineral sensor 33 may be located between a rear end of the filter unit 20 and a front end of the water discharge pipe 70.

According to an embodiment disclosed herein, a controller 400 may adjust an output voltage of a pump 160 based on data sensed by a flow rate sensor 34 and/or a mineral sensor 33.

For example, the controller 400 may calculate the output voltage of the pump 160 corresponding to the amount of minerals to be supplied to filtered water for a required time until the filtered water that has passed through the flow rate sensor 34 and/or the mineral sensor 33 may be introduced into the mineral mixer 120 through the water supply pipe 71.

Thus, the drinking water supply device 1 may supply minerals based on the flow rate or mineral value sensed from filtered water flowing in the filtered water pipe 30 to generate mineral water containing a predetermined content of minerals.

The mineral sensor 33 may be located at the front end of the flow rate sensor 34. As variation in the mineral content contained in filtered water may be less than variation in the flow rate, it may be possible to rapidly calculate or find data regarding the variation in the mineral content and flow rate.

The mineral water supply module 100 may include a mineral water supply pipe 110 that connects to the mineral mixer 120 to supply minerals. The mineral water supply pipe 110 may be provided with a mineral cartridge or container 140 configured to store condensed mineral liquid, a pump 160 configured to pressurize the mineral cartridge 140 to discharge minerals, and a mineral supply valve 130 configured to selectively supply minerals to the mineral mixer 120.

The mineral water supply module 100 may supply to the mineral mixer 120 a high concentration of condensed minerals. The mineral cartridge 140 may store condensed mineral liquid in which minerals, e.g., calcium (Ca), potassium (K), magnesium (Mg), and sodium (Na), may be mixed. For example, the mineral content or concentration of the condensed mineral liquid stored in the mineral cartridge 140 may be about 200 times the average concentration of minerals contained in filtered water.

According to experimental results of an embodiment disclosed herein, the amount of condensed mineral liquid to synthesize or make mineral water with a taste that user's like is 0.0006 parts per part of filtered water.

It may be necessary to supply a predetermined very small amount of minerals for a predetermined time to minimize the variation in the supply of the minerals. In order to provide mineral water that has a taste within an allowable deviation every time, it may be necessary to supply a predetermined fixed amount of minerals for a predetermined time and to uniformly supply a predetermined very small amount of minerals for a predetermined time.

Thus, the mineral water supply module 100 may be provided with a micro channel unit or micro channel 200 that may be capable of supplying a very small amount of minerals. The micro channel 200 may be in a cylindrical or polyhedral shape having a predetermined area and a predetermined length. If the pressure from the pump 160 is uniform, the amount of minerals that may be discharged from the micro channel 200 may be decided based on the area and the length of the micro channel 200.

The micro channel 200 may have a small cross-sectional area to supply a predetermined very small amount of minerals to the mineral mixer 120 for a predetermined time. In addition, the micro channel 200 may have a predetermined length in order to induce a loss in pressure of a fluid. For example, if the micro channel 200 is formed in a cylindrical shape, the diameter of the micro channel 200 may range from 0.5 mm to 1.0 mm.

A maximum diameter of the micro channel 200 may be predetermined or set in order to supply minerals within a predetermined range. For example, the diameter of the micro channel 200 may be predetermined or set to discharge filtered water or mineral water within an allowable deviation in taste when the mineral water and the filtered water may be alternately discharged. The maximum diameter of the micro channel 200 may be 1.0 mm to satisfy the above conditions and may be determined through experimentation.

The minimum diameter of the micro channel 200 may be 0.5 mm, at which it may be possible to mold or machine the micro channel 200. If the minimum diameter of the micro channel 200 is less than 0.5 mm, it may not be easy to mold or machine the micro channel 200 and may result in lower productivity.

The diameter of the micro channel 200 may be derived based on the water supply pipe having an outer diameter of 6.35 mm and the pump having a discharge flow rate of 0.1 ml/s to 1 ml/s.

If the micro channel 200 has a predetermined length range, it may be possible to reduce the pressure applied to minerals flowing in the micro channel 200 and thus discharge a predetermined amount of minerals. In addition, it may reduce an effect caused by variation in pressure that may occur due to the operation of the pump 160. In order to discharge a fixed amount of minerals within an appropriate range, the micro channel 200 may be a corresponding appropriate length. For example, the micro channel 200 may have a length ranging from 15 mm to 20 mm.

Figure 2:
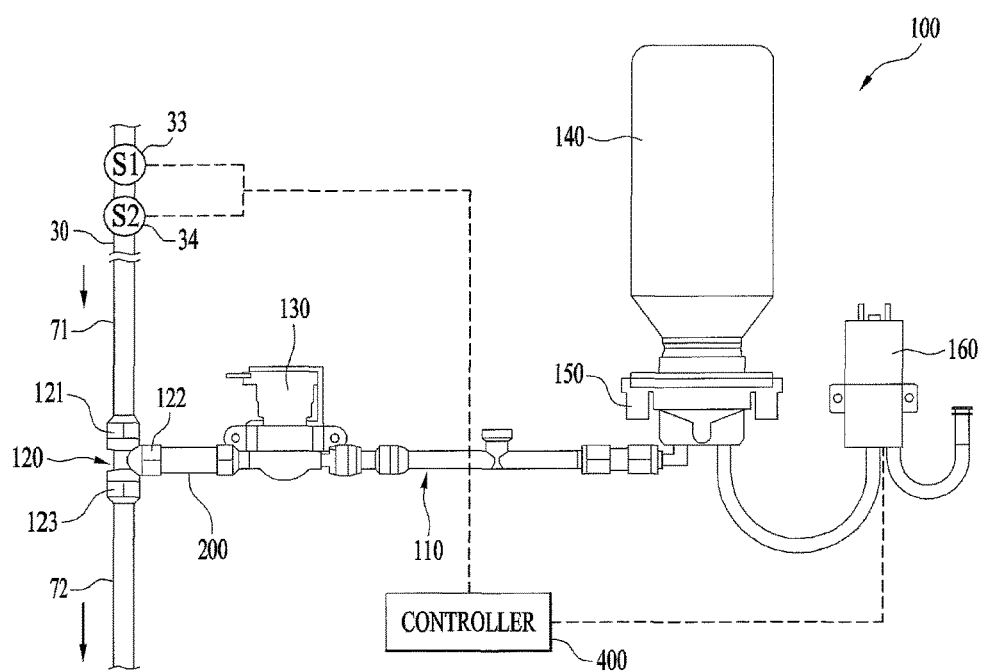
FIG. 2 is a schematic view of a mineral water supply module according to an embodiment.

According to an embodiment as shown in FIG. 2, a mineral water supply module 100 may include a water supply pipe 71 in which filtered water flows, a mineral supply pipe 110 configured to supply minerals, and a discharge pipe 72 through which filtered water or filtered water containing minerals or mineral water may be selectively discharged based on whether or not the minerals may be supplied.

The mineral water supply module 100 may further include a mineral cartridge 140 configured to store condensed minerals and a mineral cartridge receiving unit or mineral cartridge receiver 150 connecting the mineral cartridge 140 to the mineral supply pipe 110. The mineral cartridge 140 may supply minerals to the mineral supply pipe 110 through the mineral cartridge receiver 150. In addition, the mineral cartridge 140 may be separately connected to the mineral cartridge receiver 150 so the mineral cartridge 140 may be easily replaced when the minerals contained in the mineral cartridge 140 may be consumed or when the minerals contained in the mineral cartridge 140 may not have been used for a long time.

According to an embodiment, a mineral water supply module 100 may further include a pump 160 configured to pressurize at least one of the mineral cartridge 140 or the mineral supply pipe 110 to discharge minerals in the mineral cartridge 140 into the mineral supply pipe 110. The pump 160 may be connected to the mineral supply pipe 110.

In addition, the mineral water supply module 100 may further include a mineral supply valve 130 configured to selectively open and close the mineral supply pipe 110 based on whether or not mineral water is to be synthesized or made. The mineral supply valve 130 may be provided at a rear end of the mineral cartridge 140. The mineral supply valve 130 may be provided in the mineral supply pipe 110 so the mineral supply valve 130 may be adjacent to the water supply pipe 71.

The mineral water supply module 100 may be configured as a compact-sized module type unit that includes a mineral supply pipe 110, a replaceable mineral cartridge 140, a pump 160, and a mineral supply valve 130. The mineral water supply module 100 according to embodiments disclosed herein may be applied to various drinking water supply devices.

The pump 160 may be a pump configured to inject air into the mineral cartridge 140 to pressurize minerals in the mineral cartridge 140 or a pump that may be directly connected to the mineral supply pipe 110 to move minerals.

The pump 160 may be a pump that may have a variable output voltage. That is, it may be possible to adjust a number of rotations of a motor of the pump 160 by changing an output voltage of the pump 160 and adjust the amount of minerals that may be discharged.

Alternatively, the pump 160 may be a pump that may have a fixed uniform output to generate a fixed amount of mineral water every time. For example, then, the mineral water supply module 100 may adjust the amount of minerals supplied by controlling the opening time of the mineral supply valve 130.

The mineral water supply module 100 may include a mineral mixer 120 in which filtered water supplied from the water supply pipe 71 and minerals supplied from the mineral supply pipe 110 may be mixed to generate or make mineral water.

A first connection pipe 121 that may be connected to the water supply pipe 71, a second connection pipe 122 that may be connected to the mineral supply pipe 110, and a third connection pipe 123 that may be connected to the discharge pipe 72 may be provided at the mineral mixer 120.

According to embodiments described herein, a micro channel 200 defining a mineral supply line through which a micro amount of minerals may be supplied may be provided in the second connection pipe 122 to provide mineral water in which the variation in concentration of minerals may be minimized. The micro channel 200 may define a channel in which a micro amount of minerals uniformly flow for a predetermined time in order to minimize the variation in amount of minerals that may be discharged.

FIGS. 3 to 6 show a mineral mixer according to an embodiment. Referring to FIGS. 3A and 3B, a mineral mixer 120 may include a first connection pipe 121 that connects to the water supply pipe 71, a second connection pipe 122 that connects to the mineral supply pipe 110, and a third connection pipe 123 that connects to the discharge pipe 72.

A mixing space 124 in which minerals are mixed with filtered water may be provided between the first connection pipe 121 and the second connection pipe 122. The second connection pipe 122 may be connected to the first connection pipe 121 at a predetermined angle relative to the first connection pipe 121.

Filtered water introduced from the water supply pipe 71 may flow in a first direction in the first connection pipe 121, and minerals introduced from the mineral supply pipe 110 may flow differently in a second direction in the second connection pipe 122. The filtered water flowing in the first direction and the minerals flowing in the second direction may be introduced into the mixing space 124. The minerals may collide with the filtered water in the mixing space 124 and may be easily mixed with the filtered water.

The third connection pipe 123 may be connected to the first connection pipe 121 such that a fluid may flow in the third connection pipe 123 in the first direction.

Filtered water or mineral water generated in the mixing space 124 may flow in the first direction and may then be discharged through the third connection pipe 123. The inner diameter of the second connection pipe 122 may vary to adjust the amount of minerals discharged in a direction that the minerals flow.

An introduction end 122a through which minerals are introduced from the mineral supply pipe 110 to the second connection pipe 122 may be provided at the second connection pipe 122 that connects to the mineral supply pipe 110. The inner diameter of the introduction end 122a may be equal to the inner diameter of the second connection pipe 122. The introduction end 122a may extend a predetermined length in the direction that the minerals flow.

According to embodiments, a micro channel 200 provided between the introduction end 122a and a discharge end 122b may be provided in the second connection pipe 122. The discharge end 122b may be provided at an extremity of the second connection pipe 122. Minerals introduced into the micro channel 200 may be discharged into the mixing space 124 through the discharge end 122b.

The micro channel 200 may function to supply a micro amount of minerals to the mixing space 124 for a predetermined amount of time to minimize the variation in concentration of minerals in the mineral water discharged. For example, 0.075 ml of minerals may be required for 120 ml of filtered water in order to generate one cup of mineral water. That is, the amount of condensed mineral liquid that may be required to generate mineral water is 0.0006 parts per part of filtered water. In order to provide mineral water that tastes the same every time within an allowable deviation, a predetermined fixed amount of minerals may be supplied for a predetermined time.

It may be possible to reduce the inner diameter of the water supply pipe 71 to generate mineral water and reduce the amount of filtered water that may be supplied. When the inner diameter of the water supply pipe 71 is reduced, it may not be possible to provide drinking water to the user within a short amount of time, thus limiting the reduction of the inner diameter of the water supply pipe 71.

According to embodiments disclosed herein, an amount of minerals discharged from a mineral supply pipe 110 may be adjusted using a micro channel 200. The micro channel 200 may have a small diameter in order to supply a predetermined and very small amount of minerals to the mixing space 124 for a predetermined time. In addition, the micro channel 200 may have a predetermined length in order to induce a loss in pressure of a fluid.

The micro channel 200 may be in a cylindrical shape that has a predetermined diameter D and a predetermined length L. When the pressure from the pump 160 is uniform, the amount of minerals discharged from the micro channel 200 may be decided based on the diameter and the length of the micro channel 200.

The diameter of the micro channel 200 may range from 0.5 mm to 1.0 mm. The minimum diameter of the micro channel 200 may be 0.5 mm. If the minimum diameter of the micro channel 200 is less than 0.5 mm, it may not be easy to mold or machine the micro channel 200 and may result in lower productivity.

The maximum diameter of the micro channel 200 may be predetermined or set such that a predetermined and very small amount of minerals may be supplied for a predetermined time. The diameter of the micro channel 200 may be predetermined or set so filtered water may be discharged within an allowable deviation in taste after the mineral water is discharged. That is, the diameter of the micro channel 200 may be set or predetermined so the minerals that remain in the micro channel 200 may be minimal in the filtered water discharged after the mineral water is discharged.

Thus, the maximum diameter of the micro channel 200 of the mineral water supply module 100 may be 1.0 mm. The diameter of the micro channel 200 may be derived based on the water supply pipe having an outer diameter of 6.35 mm and the pump having a discharge flow rate of 0.1 ml/s to 1 ml/s.

Figure 4:
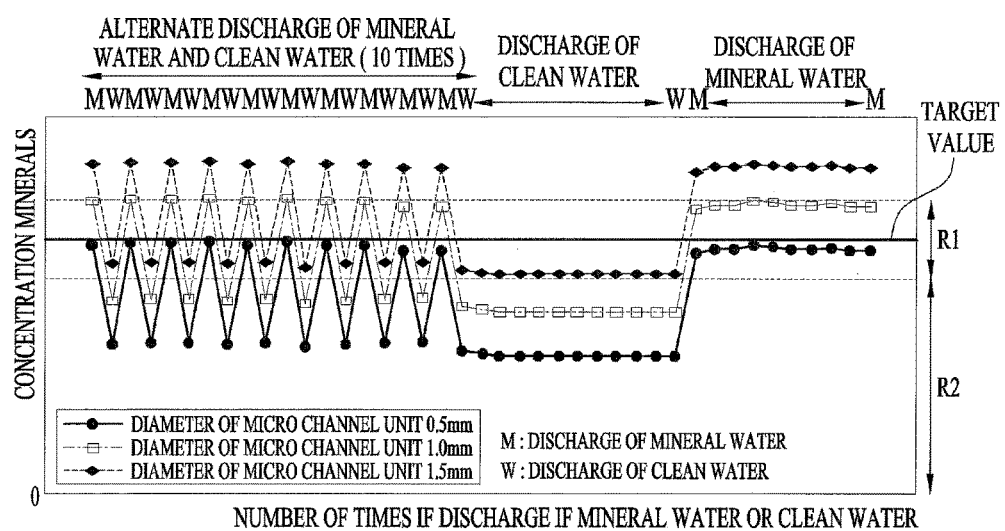
FIG. 4 is a graph showing the change in concentration of minerals based on a diameter of a micro channel when mineral water or filtered water may be discharged from the mineral water supply module according to an embodiment.

FIG. 4 is a graph showing a change in concentration of minerals based on a diameter of a micro channel when mineral water or filtered water may be discharged.

A mineral water supply module 100 according to an embodiment may provide mineral water or filtered water to the user. The user may distinguish between mineral water and filtered water based on taste.

Mineral water may have a unique taste and may be distinguished from filtered water based on the kind of minerals contained in the mineral water. In general, filtered water may contain a predetermined amount of minerals even when additional minerals may not be supplied to the filtered water. This may be because minerals contained in raw water supplied to the drinking water supply device 1 may remain in the raw water even after the raw water passes through the filter unit.

The amount of minerals in filtered water provided to the user may vary depending upon the amount of minerals contained in raw water or the kind of filter. However, the amount of minerals contained in filtered water obtained after raw water passes through the filter unit 20 may be very small. Thus, it may be difficult for the user to taste the minerals in the filtered water. The amount of minerals contained in the filtered water and the amount of minerals contained in the mineral water may differ greatly from each other.

In addition, the amount of minerals contained in the raw water introduced into the drinking water supply device 1 may differ depending upon the flow rate of the raw water, the season, or the region. The amount of minerals contained in filtered water or mineral water may have a predetermined range of deviation. That is, the filtered water discharged after a predetermined amount of minerals has been filtered by the filter unit 20 of the drinking water supply device 1 may have a predetermined range of deviation in concentration of minerals.

Mineral water generated by the mineral water supply module 100 and then discharged may also have a predetermined range of deviation in concentration of minerals that may be different from the range of deviation in concentration of minerals in the filtered water.

A predetermined range of deviation in concentration of minerals in filtered water will be referred to as a mineral concentration deviation range R2 of filtered water, and a predetermined range of deviation in concentration of minerals in mineral water will be referred to as a mineral concentration deviation range R1 of mineral water for the convenience of description.

The mineral concentration deviation range R1 of the mineral water may be derived based on an allowable deviation in taste of water where the user may taste better tasting water. Alternatively, the mineral concentration deviation range R1 of the mineral water may be a concentration deviation range of minerals contained in mineral water measured after the target amount of minerals to be supplied may be predetermined or set, in order to provide mineral water containing a predetermined amount of minerals, and after a predetermined fixed amount of minerals may be supplied.

In the mineral water supply module 100, the micro channel 200 may be connected to the water supply pipe 71. As minerals are supplied, the mineral concentration deviation range R1 of the mineral water may be easily changed based on the variation in amount of minerals supplied from the micro channel 200. That is, the smaller the diameter of the micro channel 200, the smaller the amount of minerals that may be supplied. It may be possible to accurately control the amount of minerals supplied and to reduce the variation in concentration range of minerals contained in mineral water.

FIG. 4 is a graph that shows a variation in concentration of minerals contained in mineral water and filtered water based on the diameter of the micro channel 200 from experiments according to an embodiment. In addition, the graph shows the change in concentration of minerals based on a predetermined number of times when mineral water and filtered water may be alternately discharged, a predetermined number of times when filtered water may be continuously discharged after mineral water has been discharged, and a predetermined number of times when mineral water may be continuously discharged after filtered water has been discharged. In FIG. 5, the micro channel 200 has a diameter of 0.5 mm, 1.0 mm, or 1.5 mm.

The predetermined mineral concentration deviation range R1 of the mineral water may have a range between the upper limit U and the lower limit L based on a target mineral concentration value. The upper limit U and the lower limit L may be ±15% the target mineral concentration.

According to the experimental results, the optimum mineral concentration deviation range R2 of the filtered water may be 0 or more, which may be less than the lower limit L of the mineral concentration deviation range R1 of the mineral water.

When the micro channel 200 has a diameter of 0.5 mm, a minimum diameter in consideration of productivity, the distribution of mineral concentration may approximate the target amount of minerals to be supplied. In addition, the mineral concentration may have a small distribution within the mineral concentration deviation range R1 of the mineral water. The concentration of minerals in the filtered water may be less than the upper limit of the mineral concentration deviation range R2 of the filtered water.

When the micro channel 200 has a diameter of 1.0 mm, an allowable maximum diameter, the concentration of minerals contained the mineral water may be within the mineral concentration deviation range R1 of the mineral water but may approach the upper limit U of the mineral concentration deviation range R1 of the mineral water.

The concentration of minerals contained in the filtered water may be less than the upper limit of the mineral concentration deviation range R2 of the filtered water, but may more closely approach the upper limit of the mineral concentration deviation range R2 of the filtered water than when the micro channel 200 may have a diameter of 0.5 mm.

When the micro channel 200 has a diameter of 1.5 mm, the concentration of minerals contained the mineral water may exceed the upper limit U of the mineral concentration deviation range R1 of the mineral water. The concentration of minerals contained in the filtered water may be greater than the upper limit of the mineral concentration deviation range R2 of the filtered water. That is, when the micro channel 200 has a diameter of 1.5 mm, the amount of minerals contained in the filtered water may be equivalent to the amount of minerals contained in the mineral water. As a result, filtered water may taste like mineral water to the user. When the micro channel 200 has a diameter of 1.5 mm, it may be possible to provide mineral water and filtered water deviating from the allowable deviation in taste.

Thus, when the micro channel 200 according to the embodiment has a diameter of 0.5 mm to 1.0 mm, it may be possible to supply mineral water and filtered water within the allowable deviation in taste of water. In addition, the smaller the diameter of the micro channel 200, the more consistently mineral water that has a desired taste may be supplied.

It may be possible to adjust the amount of minerals discharged by varying the length of the micro channel 200 with a predetermined diameter. The micro channel 200 may have a shape in which the length of the micro channel 200 may be greater than the cross-sectional area of the micro channel 200.

When the micro channel 200 has a predetermined length range, it may be possible to reduce the pressure applied to minerals flowing in the micro channel 200 to thus discharge a predetermined amount of minerals. In addition, it may reduce an effect caused by variation in pressure that may occur due to the operation of the pump 160.

When the micro channel 200 has a length less than the lower limit of the predetermined length range, the reduction in pressure applied to the minerals flowing in the micro channel 200 may be small with the result that a larger amount of minerals than the predetermined amount of minerals may be discharged. When the micro channel 200 is short, the pressure applied to minerals introduced from the mineral supply pipe 110 may not be sufficiently reduced due to frictional loss. Thus, the amount of the minerals discharged may be greater than the predetermined amount of minerals to be discharged.

When the micro channel 200 is longer than the upper limit of the predetermined length range, the pressure applied to the minerals flowing in the micro channel 200 may be so excessively reduced due to friction that a smaller amount of minerals than the predetermined amount of minerals may be discharged.

To discharge a fixed amount of minerals within an appropriate range, therefore, the micro channel 200 may have a corresponding appropriate length. For example, the micro channel 200 may have a length ranging from 15 mm to 20 mm.

In addition, the pump 160 may be a constant pressure pump that applies a predetermined pressure P. That is, when the pump 160 pressurizes the minerals in the micro channel 200 having the predetermined diameter D and the predetermined length L at the predetermined pressure P, a fixed amount of minerals may be discharged.

According to embodiments disclosed herein, a mineral water supply module 100 may be selected to alternatively provide filtered water or mineral water. In the mineral water supply module 100, the second connection pipe 122 may be located between the mineral mixer 120 and the mineral supply valve 130. Even when the mineral supply valve 130 is closed, some minerals may remain in the second connection pipe 122.

For example, after mineral water is discharged, the pipe channel of the micro channel 200 connected to the first connection pipe 121 may remain filled with minerals. When filtered water is selected by the user after mineral water has been discharged, the minerals remaining in the micro channel 200 may move into the filtered water introduced from the water supply pipe 71.

To achieve natural equilibrium between materials, movement from high concentration to low concentration may occur. Since there may be a large difference in concentration of minerals between the filtered water and the condensed minerals, the condensed minerals may move toward the filtered water to achieve natural equilibrium between liquids that have different concentrations.

The larger the diameter of the discharge end 122b of the second connection pipe 122, which may be connected to the mineral mixer 120, the more this phenomenon may occur. Thus, the micro channel 200 may function not only to discharge a very small fixed amount of minerals as described above but also to minimize the discharge of minerals due to a concentration equilibrium phenomenon when filtered water is discharged.

For example, when the micro channel 200 has the minimum diameter D in order to discharge a fixed amount of minerals and has a predetermined length L in order to achieve a sufficient reduction in pressure, it may be possible to minimize the amount of minerals discharged even when filtered water may be supplied. Even when filtered water is discharged after mineral water has been discharged, it may be possible to supply filtered water within the allowable deviation in taste.

Figure 5A:
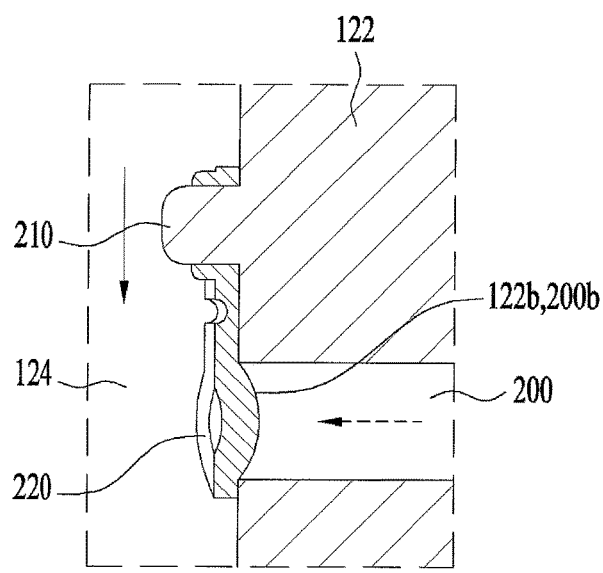
FIG. 5A is a conceptual view of an opening and closing member according to an embodiment.
Figure 5B:
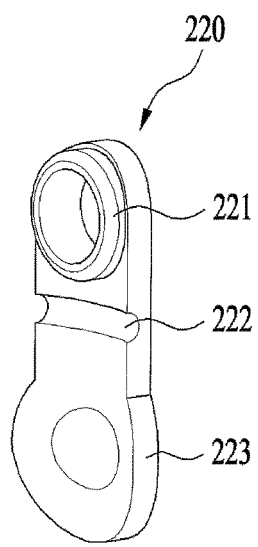
FIG. 5B is a perspective view of FIG. 5A.

Referring to FIGS. 5A and 5B, the mineral water supply module 100 may further include an opening and closing member 220 configured to selectively open and close the micro channel 200 and to prevent the occurrence of the concentration equilibrium phenomenon when filtered water and mineral water are alternately discharged. The opening and closing member 220 may be provided in the discharge end 122b of the second connection pipe 122. The second connection pipe 122 may be provided at an end where the discharge end 122b of the second connection pipe 122 may be formed with a protrusion 210 that fixes the opening and closing member 220.

The opening and closing member 220 may include a fixing part or ring 221 fixed at a side of the protrusion 210 and a deformable part or flap 223 extending a predetermined length in a longitudinal direction of the water supply pipe 71 to close the discharge end 122b of the of the second connection pipe 122.

The protrusion 210 may be formed at a surface of the discharge end 122b of the second connection pipe 122 such that the protrusion 210 may protrude a predetermined height. The fixing part 221 may be fixed to the protrusion 210 by force-fitting or welding.

The opening and closing member 220 may further include a deformable groove 222 provided between the fixing part 221 and the deformable part 223 that allows easy deformation of the deformable part 223 and that minimizes the deformation of the fixing part 221.

The thickness of the deformable groove 222 may be less than the thickness of the fixing part 221 or the deformable part 223. The displacement of the deformable groove 222 may increase, and the displacement of the fixing part 221 may decrease due to the pressure from the pump 160. Further, the deformable groove 222 may be prevented from being separated from the protrusion 210 due to excessive deformation of the fixing part 221.

The opening and closing member 220 and the protrusion 210 may protrude into the mixing space 124. The opening and closing member 220 may be parallel to the first connection pipe 121 and may be perpendicular to the micro channel 200.

When filtered water is discharged, the opening and closing member 220 may close the discharge end 122*b* of the second connection pipe 122 due to the pressure that discharges the filtered water introduced from the first connection pipe 121 to the mixing space 124 in the first direction.

When mineral water is discharged, the opening and closing member 220 may open the discharge end 122*b* of the second connection pipe 122 due to the pressure that discharges the mineral water supplied from the second connection pipe 122 in the second direction.

The deformable part 223 may deform into the mixing space 124 by a predetermined angle due to the pressure in which the pump 160 may pressurize minerals discharged through the discharge end 122*b* of the second connection pipe 122 with the result that the discharge end 122*b* of the second connection pipe 122 may be opened. That is, when the pressure from the pump 160 is a predetermined level or higher, the opening and closing member 220 may open the micro channel unit 200.

The opening and closing member 220 may be made of a soft synthetic resin or a rubber material so the opening and closing member 220 may be easily deformed when pressure is applied. For example, the opening and closing member 220 may be made of, e.g., urethane, ethylene propylene diene monomer rubber (EPDM), or nitrile butadiene rubber (NBR).

The mineral mixer 120 may be configured to have a structure in which the first connection pipe 121 may be connected to the extremity 200*b* of the micro channel unit 200 and the protrusion 210 and the opening and closing member 220 may protrude into the mixing space 124. However, it may be difficult to manufacture the mineral mixer 120.

Figures 6A, 6B:
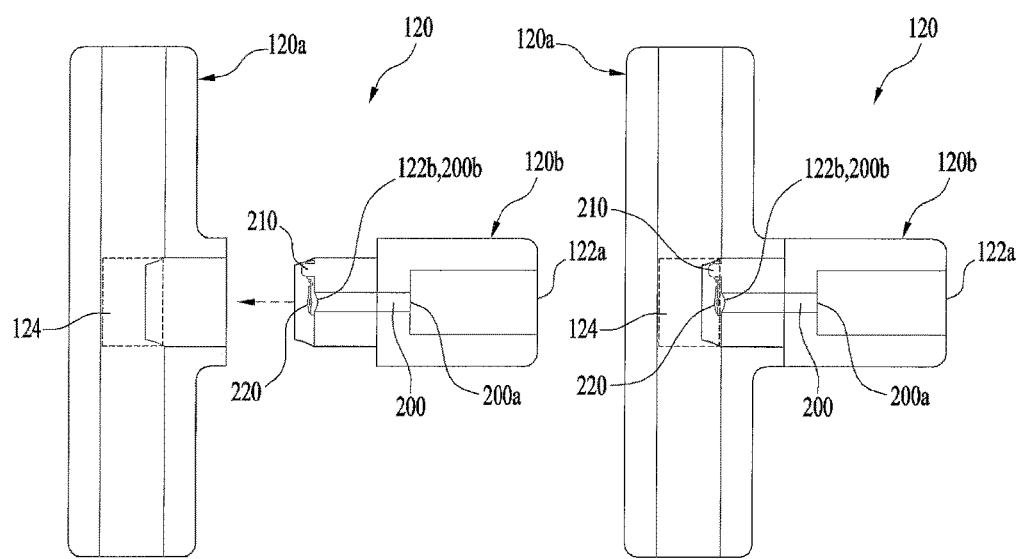
FIGS. 6A and 6B are assembly views of a mineral mixer according to an embodiment.

Referring to FIGS. 6A and 6B, a mineral mixer 120 according to an embodiment may include a first body 120*a* that forms the first connection pipe 121 and the third connection pipe 123 and a second body 120*b* that forms the second connection pipe 122. The first body 120*a* and the second body 120*b* may be coupled to each other. The mineral mixer 120 according to the embodiment may be easier to manufacture.

The first body 120*a* may be configured such that the first connection pipe 121 and the third connection pipe 123 may be linearly connected. The first body 120*a* may include a protrusion that protrudes out a predetermined height between the first connection pipe 121 and the third connection pipe 123. The first body 120*a* may be in a T shape where a second direction pipe may be formed at a side of a first direction pipe channel such that the second direction pipe may be perpendicular to the first direction pipe channel.

The mineral mixer 120 may include a second body 120*b* that forms the second connection pipe 122. The second body 120*b* may be inserted into the protrusion of the first body 120*a*. The second body 120*b* may be provided with an introduction end 122*a* and a micro channel 200 into which minerals may be supplied from the mineral supply pipe 110. In addition, the second body 120*b* may be provided with a protrusion 210 and an opening and closing member 220 formed on the side of the discharge end 200*b* of the micro channel 200.

A first side of the second body 120*b* connected to the mineral supply pipe 110 may extend a predetermined length and may have the same outer diameter and inner diameter as the mineral supply pipe 110. The micro channel 200 may be provided at a second side of the second body 120*b*. That is, the second body 120*b* may be configured such that the inner diameter of the second body 120*b* may be reduced in a direction that minerals flow.

The second body 120*b* may be provided with a step part having an outer diameter corresponding to the inner diameter of the protrusion such that the step part may be inserted into the pipe channel of the protrusion of the first body 120*a*.

The first body 120*a* and the second body 120*b* may be coupled to each other by inserting the step part into the pipe channel of the protrusion. In addition, the outer circumferential surfaces of the protrusion of the first body 120*a* and the step part of the second body 120*b* that contact may be welded to connect the first body 120*a* and the second body 120*b* and to prevent water leakage.

That is, the second body 120*b*, in which the micro channel 200, the protrusion 210, and the opening and closing member 220 have been previously formed, may be inserted into the first body 120*a*, and the second body 120*b* may be fixed to the first body 120*a*. Thus, the mineral mixer 120 may be more easily configured. In addition, the structure of the mineral mixer 120 may be simplified, productivity may be improved, and manufacturing costs may be reduced.

FIGS. 7 and 8 show a mineral mixer according to another embodiment. Referring to FIGS. 7A and 7B, a mineral mixer 120' according to another embodiment may include a first connection pipe 121 connected to the water supply pipe 71, a second connection pipe 122' connected to the mineral supply pipe 110, and a third connection pipe 123 connected to the discharge pipe 72. A mixing space 124 where minerals may be mixed with filtered water may be formed between the first connection pipe 121 and the second connection pipe 122'.

The second connection pipe 122' may be configured such that the inner diameter of the second connection pipe 122' may increase to adjust the amount of minerals that are discharged in a direction in which the minerals flow. That is, the second connection pipe 122' may be provided with a micro channel 200 at an introduction end 122*a*' connected to the mineral supply pipe 110.

For example, an introduction end 200*a* of the micro channel 200 may be formed at the introduction end 122*a*' of the second connection pipe 122', and the micro channel 200 may extend a predetermined length. In addition, a protrusion 210 and an opening and closing member 220 may be provided at a discharge end 200*b* of the micro channel 200.

The micro channel 200, the protrusion 210, and the opening and closing member 220 were described when describing the mineral mixer according to the previous embodiment of the present application, and therefore a further detailed description thereof will be omitted.

The second connection pipe 122' may be connected to the mixing space 124 where the inner diameter of the second connection pipe 122' may increase at the discharge end 200*b* of the micro channel 200. A mineral storage space where minerals discharged from the micro channel 200 may be introduced and temporarily stored may be formed between the discharge end 200*b* of the micro channel 200 and the mixing space 124.

The minerals discharged from the micro channel 200 into the mineral storage space may move to the mixing space 124 according to a diffusion phenomenon that moves toward equilibrium in concentration between the minerals and the filtered water introduced from the first connection pipe 121. In addition, filtered water may be introduced into the mineral storage space so the minerals may be preliminarily mixed with the filtered water.

Figures 8A, 8B:
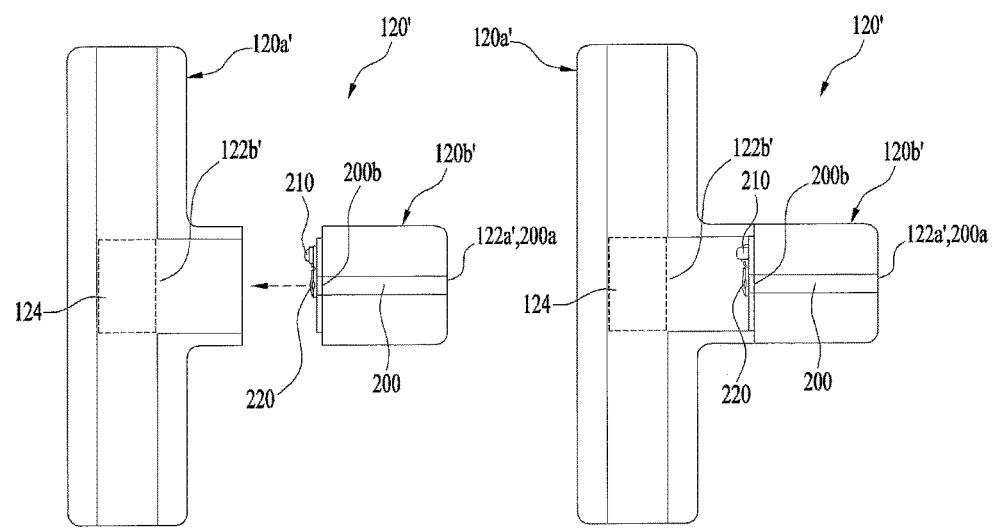
FIGS. 8A and 8B are assembly views of a mineral mixer according to another embodiment.

Referring to FIGS. 8A and 8B, a mineral mixer 120' according to another embodiment may include a first body 120a' that integrally forms the first connection pipe 121 and the third connection pipe 123 and a second body 120b' that forms the second connection pipe 122. The first body 120a' and the second body 120b' may be coupled to each other.

The first body 120a' may be configured such that the first connection pipe 121 and the third connection pipe 123 may be linearly connected. The first body 120a' may include a protrusion that protrudes out at a predetermined height between the first connection pipe 121 and the third connection pipe 123.

The protrusion may be provided with a mineral storage space that may have a cross-sectional area greater than the cross-sectional area of a micro channel 200 in a direction in which minerals flow.

The first body 120a' may be in a T shape where a second direction pipe may be formed at a side of a first direction pipe channel such that the second direction pipe may be perpendicular to the first direction pipe channel.

The mineral mixer 120' may include a second body 120b' that forms the second connection pipe 122. The second body 120b' may be coupled to the protrusion of the first body 120a'. The second body 120b' may be provided with a micro channel 200, into which minerals may be supplied from the mineral supply pipe 110. In addition, the second body 120b' may be provided with a protrusion 210 and an opening and closing member 220 formed on the side of a discharge end 200b of the micro channel 200.

A side of the second body 120b' that the discharge end 200b of the micro channel 200 may be formed may be directly connected to the protrusion of the first body 120a'. In addition, the outer circumferential surfaces of the first body 120a' and the second body 120b' that contact may be welded so as to connect the first body 120a' and the second body 120b' and to prevent water leakage.

That is, the second body 120b' may not include a connection structure configured to be inserted into a pipe channel of the protrusion, and only the micro channel 200, the protrusion 210, and the opening and closing member 220 may be formed in the second body 120b'. Thus, the structure of the second body 120b' may be further simplified.

Hereinafter, the construction of the mineral water supply module 100 and an embodiment of a controller for controlling the amount of minerals that are supplied will be described in detail with reference to FIGS. 2 and 9.

Referring to FIGS. 2 and 9, a drinking water supply device 1 according to an embodiment may further include a controller 400 configured to control an output of a pump 160 based on signals from a flow rate sensor 34 and a mineral sensor 33 that may be provided in the filtered water pipe 30. The controller 400 may adjust the amount of minerals discharged from the mineral water supply module 100 based on a mineral content and a flow rate of filtered water.

Thus, it may be possible to uniformly control the mineral content of mineral water based on an environment in which the drinking water supply device may be used, for example, a place at or in which a user may dwell, a season, and/or a region, to provide mineral water with a uniform taste.

For example, the controller 400 may control the amount of minerals supplied by adjusting the output voltage of the pump 160 based on the flow rate sensed by the flow rate sensor 34 so mineral water with a uniform mineral content may be supplied.

When the flow rate sensed by the flow rate sensor 34 is higher than a predetermined flow rate, the controller 400 may control the output voltage of the pump 160 to increase in order to increase the amount of minerals supplied.

When the flow rate sensed by the flow rate sensor 34 is lower than the predetermined flow rate, the controller 400 may control the output voltage of the pump 160 to decrease in order to decrease the amount of minerals supplied.

That is, the amount of minerals may be increased or decreased in proportion to the flow rate of filtered water so the mineral content of mineral water discharged may be uniform.

The controller 400 may also adjust the output voltage of the pump 160 based on an output voltage value preset or predetermined according to the flow rate measured using an output voltage per flow rate data table as shown in FIG. 9A.

The output voltage per flow rate data table may include output voltage data of the pump 160 decided through experimentation based on a plurality of flow rate ranges. The output voltage of the pump 160 based on the flow rate ranges may be decided within an allowable error range of the mineral content of mineral water. That is, the controller 400 may set or control the output voltage value of the pump 160 to a value corresponding to a flow rate range in the output voltage per flow rate data table that may be equivalent to the flow rate sensed by the flow rate sensor 34.

The controller 400 may control the amount of minerals discharged by adjusting the output voltage of the pump 160 based on the mineral content detected by the mineral sensor 33 so mineral water with a uniform mineral content may be supplied.

When the amount of minerals detected by the mineral sensor 33 is greater than a predetermined amount of minerals, the controller 400 may decrease the amount of minerals supplied. When the amount of minerals detected by the mineral sensor 33 is less than the predetermined amount of minerals, the controller 400 may increase the amount of minerals supplied.

If both the mineral sensor 33 and the flow rate sensor 34 are provided, the controller 400 may select a flow rate range based on one of a plurality of mineral content ranges according to the amount of minerals detected by the mineral sensor 33.

That is, the controller 400 may select one of a plurality of predetermined output voltage per flow rate data tables based on the mineral content range as shown in FIG. 9B. The controller 400 may select an output voltage based on the sensed flow rate using the selected output voltage per flow rate data table and may adjust the output voltage of the pump 160 based on the selected output voltage value.

The pump output voltage per mineral content and flow rate data table may include output voltage data of the pump 160 decided through experimentation based on a plurality of mineral content and flow rate ranges. The output voltage of the pump 160 based on the mineral content and flow rate ranges may be decided within an allowable error range of the mineral content of mineral water.

If the mineral content sensing means or sensor presets a value per region and season, the controller 400 may control the output voltage of the pump 160 based on data per flow rate according to a region or season selection value selected.

According to another embodiment disclosed herein, a drinking water supply device 1 may include a controller 400 configured to control an opening time of a mineral supply valve 130 according to a signal from a mineral content sensing means or sensor. The drinking water supply device 1 may be a device capable of supplying a fixed amount of filtered water to the mineral water supply module 100 in order to discharge a fixed amount of mineral water.

The controller 400 may control the opening time of the mineral supply valve 130 according to a signal from the mineral content sensing means to adjust the amount of minerals that may be supplied.

The pump 160 may be a constant speed pump, the output of which may not be adjustable. Thus, the pump 160 may operate for a time corresponding to the opening time of the mineral supply valve 130.

The mineral content sensing means may be a mineral sensor 33 or a value that may be predetermined or preset based on region and season, stored in the controller 400, and selected by a user.

As shown in FIG. 9C, the controller 400 may decide the opening time of the mineral supply valve 130 using a data table indicating the opening time of the mineral supply valve 130 based on the mineral content detected by the mineral sensor 33.

For example, the controller 400 may select the opening time of the mineral supply valve 130 based on a mineral content range corresponding to the mineral content sensed by the mineral sensor 33 and may open the mineral supply valve 130 for the selected opening time.

If the mineral content sensing means is a set value selected by a user, the controller 400 may open the mineral supply valve 130 for an opening time that may be predetermined or preset based on the region or the season selected by the user.

Figure 10:
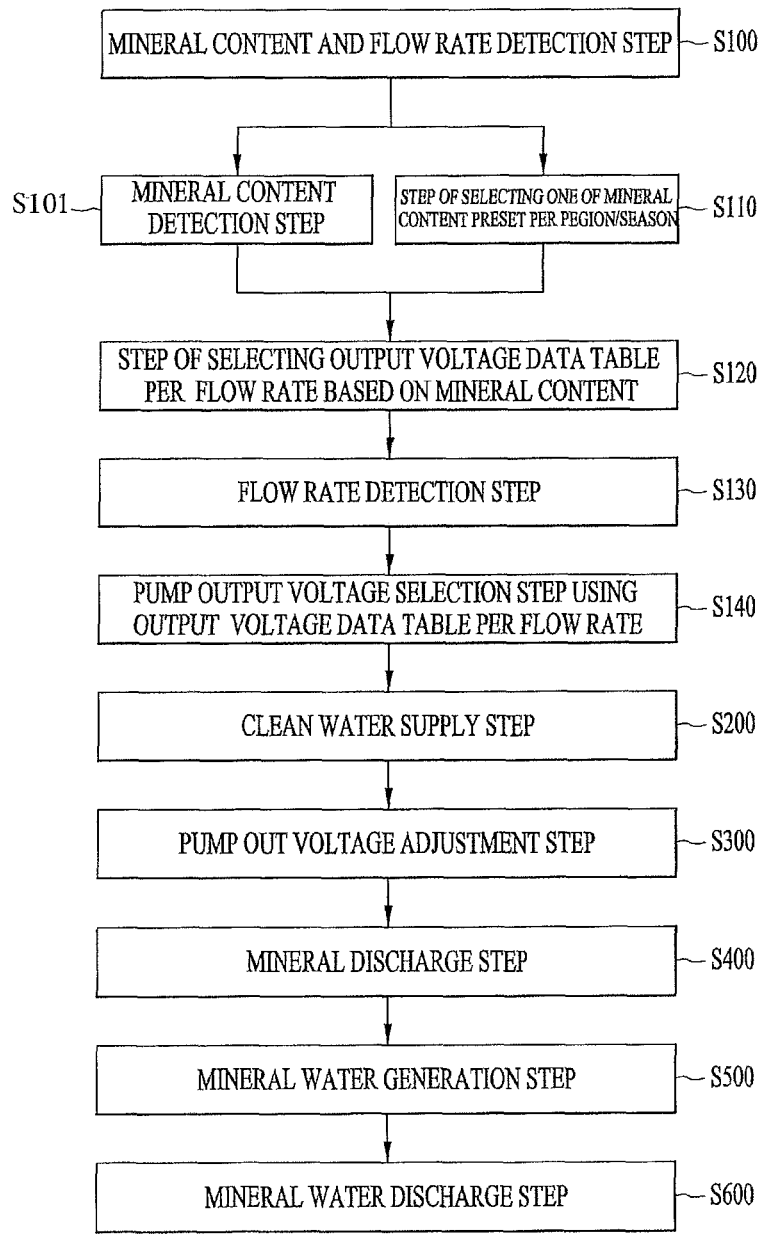
FIG. 10 is a flowchart showing a method of controlling a drinking water supply device that may supply mineral water

According to embodiments disclosed herein, as shown in FIG. 10, a method of controlling the drinking water supply device may include a mineral content and flow rate detection step S100 of detecting the flow rate of filtered water flowing in the filtered water pipe 30.

As detecting minerals at the mineral content and flow rate detection step S100 progresses, a mineral content detection step S101 using the mineral sensor 33 of detecting the mineral content of filtered water that has been filtered may be carried out. Alternatively, as detecting minerals progresses, a selection step S110 of a user selecting one of a plurality of mineral contents preset per region and season may be carried out. The selection step S110 may be carried out instead of the mineral content detection step S101.

One of the plurality of data tables having a predetermined mineral content range corresponding to the mineral content detected by one of the two mineral detection processes may be selected. The respective data tables may show output voltages based on a plurality of flow rates.

A step S120 of selecting an output voltage per flow rate data table based on the mineral content may be carried out, and a flow rate detection step S130 of detecting the flow rate of filtered water may be performed.

The flow rate detected at the flow rate detection step S130 may be a flow rate that may be sensed by the flow rate sensor 34 provided in the filtered water pipe 30. Alternatively, if the drinking water supply device 1 is configured to discharge a fixed amount of water, the flow rate may be preset.

After the flow rate detection step S130, a pump output voltage selection step S140 of selecting the output voltage of the pump 160 based on the flow rate detected using the output voltage per flow rate data table selected at the step S120 of selecting the output voltage per flow rate data table based on the mineral content may be carried out.

A filtered water supply step S200 of supplying filtered water that has passed through the filtered water pipe 30 to the mineral mixer 120 through the water supply pipe 71 may be carried out.

When the filtered water is supplied to the mineral mixer 120, the controller 400 may control the amount of minerals that may be supplied to the mineral mixer 120 based on the mineral content and flow rate of the filtered water detected at the mineral content and flow rate detection step S100.

That is, after the filtered water supply step S200, a pump output voltage adjustment step S300 of the controller 400 adjusting the output voltage of the pump in order to adjust the amount of minerals supplied from the mineral supply pipe 110 to the mineral mixer 120 may be carried out.

A mineral discharge step S400 of operating the pump 160 based on the output voltage of the pump 160 adjusted at the pump output voltage adjustment step S300 to discharge a predetermined amount of minerals to the mineral mixer 120 may be carried out. The filtered water supply step S200, the pump output voltage adjustment step S300, and the mineral discharge step S400 may be carried out simultaneously.

A mineral water generation step S500 of mixing the minerals discharged at the mineral discharge step S400 with the filtered water supplied at the filtered water supply step S200 in the mineral mixer 120 to generate or make mineral water may be carried out.

A mineral water discharge step S600 of discharging the mineral water that may contain a predetermined amount of minerals generated at the mineral water generation step S500 to the outside may be carried out.

The mineral water discharged at the mineral water discharge step S600 may be mineral water containing a predetermined range of minerals. It may be possible to provide mineral water within an allowable range in taste in which a user feels that the water may taste the same.

According to an embodiment, a drinking water supply device may prevent changes in a taste of the mineral water due to a mineral content and flow rate of filtered water introduced into a mineral water supply module.

A drinking water supply device capable of providing mineral water containing minerals within a predetermined range of concentration may be provided.

A drinking water supply device capable of supplying mineral water having a uniform taste even when the flow rate of water may vary depending upon a place where a user may be located or dwell may be provided.

A drinking water supply device capable of supplying mineral water having a uniform taste even when the content of raw water may vary depending upon a region or a season may be provided.

According to an embodiment disclosed herein, a mineral water supply module may provide mineral water containing minerals within a predetermined range of concentration.

A mineral water supply module may prevent the diffusion of minerals remaining in a mineral supply pipe when filtered water is discharged and thus may provide filtered water within an allowable deviation in taste.

A mineral water supply module may alternately provide mineral water and filtered water having a regular taste within an allowable deviation in taste.

A mineral water supply module may accelerate the mixing of minerals with filtered water and thus may provide mineral water having a uniform taste when the mineral water is discharged.

A mineral water supply module may be provided with a simple structure and may be easily manufactured.

A mineral water supply module may provide a mineral water supply module having a compact structure that may be easily applicable to various drinking water supply devices.

According to embodiments disclosed herein, a drinking water supply device may include a filtered water pipe configured to channel water that has been filtered through a filter, or filtered water, and a flow rate sensor configured to sense the flow rate of the filtered water flowing in the filtered water pipe.

The drinking water supply device may further include a water supply pipe provided at a rear end of the filtered water pipe for discharging filtered water and a mineral supply pipe configured to supply minerals to the water supply pipe and provided with a mineral supply valve configured to selectively open and close depending on whether or not mineral water is to be generated.

The drinking water supply device may further include a mineral cartridge or container configured to connect to the mineral supply pipe and configured to store condensed minerals, a mineral mixer configured to connect to the water supply pipe and the mineral supply pipe and configured to allow mixing of the minerals from the mineral supply pipe with the filtered water in the water supply pipe, and a discharge pipe configured to connect to the mineral mixer for discharging filtered water or mineral water. The mineral mixer may be connected to a water discharge pipe that may be connected to and extend from the filtered water pipe.

Additionally, the drinking water supply device may further include a pump configured to pressurize at least one of the mineral cartridge or the mineral supply pipe such that the minerals stored in the mineral cartridge may be supplied to the mineral mixer. The pump may be configured so a number of rotations of a motor of the pump may vary based on an output voltage of the pump in order to vary the amount of minerals that may be supplied based on the flow rate of the filtered water.

That is, the drinking water supply device may provide mineral water containing minerals within a predetermined content range by varying the output voltage of the pump through a controller in order to adjust the amount of minerals that may be supplied to the water supply pipe based on the flow rate of the filtered water sensed by the flow rate sensor.

For example, the controller may compare the flow rate sensed by the flow rate sensor with a predetermined reference flow rate and may increase the output voltage of the pump to increase the amount of minerals that may be supplied when the sensed flow rate is greater than the reference flow rate.

The controller may decrease the output voltage of the pump to decrease the amount of minerals that may be supplied when the sensed flow rate is less than the reference flow rate.

Alternatively, the controller may adjust the output voltage of the pump to a predetermined output voltage value based on the measured flow rate using an output voltage per flow rate data table.

The drinking water supply device may detect the amount of minerals in filtered water, which may vary depending upon the region or the season, and may adjust the amount of minerals that may be supplied to generate mineral water.

The drinking water supply device may further include a mineral sensor provided in the filtered water pipe for detecting the mineral content of filtered water introduced into the mineral mixer. The mineral sensor may be located at a front end of the flow rate sensor.

The mineral sensor and the flow rate sensor may be provided between a rear end of the filter and a front end of the water discharge pipe because a predetermined time may be necessary for the controller to decide and adjust the output voltage of the pump.

The controller may select one of a plurality of predetermined output voltage per flow rate data tables based on a mineral content range according to the mineral content detected by the mineral sensor.

The controller may select the output voltage of the pump corresponding to the flow rate sensed by the flow rate sensor in the selected output voltage per flow rate data table to adjust the output voltage of the pump.

That is, the drinking water supply device may adjust the amount of minerals supplied by adjusting the output voltage of the pump based on the flow rate and the mineral content of filtered water to provide mineral water containing a predetermined concentration of minerals.

According to another embodiment disclosed herein, a drinking water supply device may include a filtered water pipe configured to channel water that has been filtered through a filter, or filtered water, and a mineral content sensing means to sense the mineral content of the filtered water.

The mineral content sensing means may be a mineral sensor configured to detect the mineral content of the filtered water or a mineral content data value of the filtered water preset or predetermined based on a region or a season.

The drinking water supply device may further include a water supply pipe provided at a rear end of the filtered water pipe for discharging the filtered water, a mineral supply pipe for supplying minerals to the water supply pipe, the mineral supply pipe provided with a mineral supply valve that may be selectively opened and closed depending upon whether or not mineral water is to be generated, and a discharge pipe for discharging filtered water or mineral water.

The drinking water supply device may further include a mineral cartridge configured to connect to the mineral supply pipe and configured to store condensed minerals and a mineral mixer connected to the water supply pipe and the mineral supply pipe, the mineral mixer configured to allow mixing of the minerals from the mineral supply pipe with the filtered water in the water supply pipe.

The drinking water supply device may further include a constant speed pump configured to pressurize at least one of the mineral cartridge or the mineral supply pipe so the minerals stored in the mineral cartridge may be supplied to the mineral mixer.

The drinking water supply device may further include a controller configured to decrease the opening time of the mineral supply valve when the amount of minerals sensed by the mineral content sensing means may be large and to increase the opening time of the mineral supply valve when the amount of minerals sensed by the mineral content sensing means may be small.

That is, if the drinking water supply device is configured to supply a fixed amount of filtered water and to include a pump, the output voltage of which may not be adjustable, the controller may adjust the opening time of the mineral supply valve in order to provide a predetermined concentration of mineral water.

According to embodiments disclosed herein, a method of controlling a drinking water supply device may include detecting a mineral content and flow rate of filtered water using a mineral sensor and a flow rate sensor provided in a filtered water pipe (a mineral content and flow rate detection step).

The method may further include supplying filtered water to a mineral mixer through a water supply pipe (a filtered water supply step).

The method may further include adjusting the output voltage of the pump in order to control the amount of minerals that are supplied from a mineral supply pipe to the mineral mixer based on the mineral content and flow rate of the filtered water detected at the mineral content and flow rate detection step (a pump output voltage adjustment step).

The method may further include operating the pump based on the output voltage of the pump adjusted at the pump output voltage adjustment step to discharge a predetermined amount of minerals to the mineral mixer (a mineral discharge step).

The method may further include mixing the minerals discharged at the mineral discharge step with the filtered water supplied at the filtered water supply step in the mineral mixer to generate mineral water (a mineral water generation step) and discharging the mineral water generated at the mineral water generation step through a cock (a mineral water discharge step).

According to an embodiment, a mineral water supply module for providing mineral water to a user may include a water supply pipe for supplying filtered water, a mineral supply pipe for supplying minerals, and a discharge pipe for discharging filtered water or filtered water containing minerals, or mineral water, depending upon whether minerals are supplied.

The mineral water supply module may further include a mineral mixer, which includes a first connection pipe connected to the water supply pipe, a second connection pipe connected to the mineral supply pipe, and a third connection pipe connected to the discharge pipe. A mixing space, in which minerals are mixed with filtered water, may be formed between the first connection pipe and the second connection pipe.

The mineral water supply module may further include a micro channel provided in the second connection pipe in order to provide mineral water, in which the deviation in concentration of minerals is minimized, the micro channel defining a mineral supply line, through which a very small amount of minerals are supplied to the mixing space.

The micro channel may be configured to have a minimum diameter and a predetermined length at which the micro channel may be molded and machined so the micro channel supplies a predetermined fixed amount of minerals for a predetermined time.

The mixing space may be a space in which filtered water flowing in the first connection pipe in a first direction and minerals flowing in the second connection pipe in a second direction, which is different from the first direction, collide with each other so the minerals are mixed with the filtered water.

The mineral water supply module may further include an opening and closing member for selectively opening and closing the micro channel.

The opening and closing member, which is a means for fundamentally preventing the diffusion of minerals remaining in the micro channel according to concentration equilibrium when filtered water is selected by a user, may be provided at the discharge end of the micro channel, through which minerals are supplied to the mixing space.

The second connection pipe may be provided at an end thereof, at which the discharge end of the micro channel is formed, with a protrusion for fixing the opening and closing member.

The opening and closing member may include a fixing part fixed to the protrusion, a deformable part extending from the fixing part to the discharge end of the micro channel by a predetermined length, and a deformable groove provided between the fixing part and the deformable part for allowing easy deformation of the deformable part while minimizing the deformation of the fixing part.

The opening and closing member may be made of a soft synthetic resin or a rubber material so the opening and closing member is opened when the pressure applied by the pump is equal to or greater than a predetermined level and so the opening and closing member is easily deformable when pressure is applied thereto.

To improve productivity, the mineral mixer may include a first body, which integrally forms the first connection pipe and the third connection pipe, and a second body, which forms the second connection pipe. The first body and the second body may be coupled to each other.

The first body may include a protrusion diverging perpendicularly between the first connection pipe and the third connection pipe so the protrusion protrudes a predetermined height The second body may be provided at the other side thereof, at which the micro channel is provided, with a step part having an outer diameter corresponding to the inner diameter of the protrusion. The second body may be coupled to the first body by inserting the step part into the pipe channel of the protrusion and welding the step part to the pipe channel of the protrusion.

One side of the second body, at which the discharge end of the micro channel is formed, may be directly connected to the outer circumferential surface of the protrusion, and the outer circumferential surface of the second body may be welded to the outer circumferential surface of the protrusion so the second body is coupled to the first body.

A mineral water generation module may include a water supply pipe for supplying filtered water, a mineral supply pipe for supplying minerals, and a discharge pipe for discharging filtered water or filtered water containing minerals, or mineral water, depending upon whether minerals are supplied.

The mineral water generation module may further include a mineral mixer, which includes a first connection pipe connected to the water supply pipe, a second connection pipe connected to the mineral supply pipe, and a third connection pipe connected to the discharge pipe. A mixing space, in which minerals are mixed with filtered water, may be formed between the first connection pipe and the second connection pipe.

The mineral water generation module may further include a micro channel provided in the second connection pipe for selectively discharging filtered water or mineral water. The micro channel may be formed in a cylindrical shape having a diameter of 0.5 mm to 1.0 mm so a predetermined very small amount of minerals are supplied to the mixing space through the micro channel.

This application relates to U.S. application Ser. Nos. 14/963,327 and 14/963,353, both filed on Dec. 9, 2015, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drinking water supply device comprising:
   a filtered water pipe configured to channel filtered water that has been filtered through a filter;
   a flow rate sensor configured to sense a flow rate of the filtered water;
   a mineral sensor provided in the filtered water pipe and configured to detect a mineral content of the filtered water;
   a water supply pipe provided downstream of the filtered water pipe;
   a mineral supply pipe configured to supply minerals to the water supply pipe and provided with a mineral supply valve configured to selectively open and close depending on whether or not mineral water is to be generated;
   a mineral cartridge configured to connect to the mineral supply pipe and configured to store condensed minerals;
   a mineral mixer configured to connect to the water supply pipe and the mineral supply pipe and configured to allow mixing of the minerals from the mineral supply pipe with the filtered water in the water supply pipe;
   a pump configured to pressurize at least one of the mineral cartridge or the mineral supply pipe such that the minerals stored in the mineral cartridge are supplied to the mineral mixer;
   a water discharge pipe configured to connect to the mineral mixer and the water supply pipe to discharge filtered water or mineral water; and
   a controller configured to control an output voltage of the pump in order to adjust an amount of minerals that are supplied to the water supply pipe based on a flow rate sensed by the flow rate sensor,
   wherein the flow rate sensor and the mineral sensor are provided downstream of the filter and upstream of the water discharge pipe,
   wherein the controller selects one of a plurality of data tables according to the mineral content detected by the mineral sensor, and controls the output voltage of the pump based on the selected data table, each of the data tables identifying output voltages per flow rates based on a corresponding mineral content range,
   wherein the filtered water pipe includes a cold water pipe that diverges from the filtered water pipe to channel cold water that has passed through a cooling unit, and a distribution pipe configured to connect the filtered water pipe with the cold water pipe, and
   wherein the water discharge pipe is configured to connect to the mineral mixer and configured to selectively discharge filtered water or cold water from the distribution pipe.

2. The drinking water supply device according to claim 1, wherein the pump includes a motor configured to vary a number of rotations based on the output voltage of the pump.

3. The drinking water supply device according to claim 1, wherein the controller compares the flow rate sensed by the flow rate sensor with a predetermined reference flow rate and increases the output voltage of the pump in order to increase the amount of minerals that are supplied when the sensed flow rate is greater than the reference flow rate.

4. The drinking water supply device according to claim 1, wherein the controller compares the flow rate sensed by the flow rate sensor with a predetermined reference flow rate and decreases the output voltage of the pump in order to decrease the amount of minerals that are supplied when the sensed flow rate is less than the reference flow rate.

5. The drinking water supply device according to claim 1, wherein the controller adjusts the output voltage of the pump to equal a predetermined output voltage value based on the sensed flow rate using the selected data table.

6. The drinking water supply device according to claim 1, wherein the flow rate sensor is provided downstream of the mineral sensor.

7. The drinking water supply device according to claim 1, wherein the controller selects the output voltage based on an entry in the selected data table associated with the flow rate sensed by the flow rate sensor to adjust the output voltage of the pump.

8. A drinking water supply device comprising:
   a filtered water pipe configured to channel filtered water that has been filtered through a filter;
   a mineral sensor provided in the filtered water pipe and configured to detect a mineral content of the filtered water;
   a water supply pipe provided downstream of the filtered water pipe;
   a mineral supply pipe configured to supply minerals to the water supply pipe and provided with a mineral supply valve configured to selectively open and close depending on whether or not mineral water is to be generated;
   a mineral cartridge configured to connect to the mineral supply pipe and configured to store condensed minerals;
   a mineral mixer configured to connect to the water supply pipe and the mineral supply pipe and configured to allow mixing of the minerals from the mineral supply pipe with the filtered water in the water supply pipe;
   a constant speed pump configured to pressurize at least one of the mineral cartridge or the mineral supply pipe such that the minerals stored in the mineral cartridge are supplied to the mineral mixer;
   a water discharge pipe configured to connect to the mineral mixer and the water supply pipe to discharge filtered water or mineral water; and
   a controller configured to control an opening time of the mineral supply valve in order to adjust an amount of minerals that are supplied to the water supply pipe based on the mineral content sensed by the mineral sensor, wherein the mineral sensor is provided downstream of the filter and upstream of the water discharge pipe,
   wherein the filtered water pipe includes a cold water pipe that diverges from the filtered water pipe to channel cold water that has passed through a cooling unit, and a distribution pipe configured to connect the filtered water pipe with the cold water pipe, and
   wherein the water discharge pipe is configured to connect to the mineral mixer and configured to selectively discharge filtered water or cold water from the distribution pipe.

9. The drinking water supply device according to claim 8, wherein the controller is further configured to control the opening time of the mineral supply valve based on a region or a season associated with the drinking water supply device.

10. A method of controlling a drinking water supply device comprising a mineral water supply module that includes a filtered water pipe that channels filtered water that has been filtered by a filter, a water discharge pipe that discharges filtered water or mineral water, a mineral supply pipe, a mineral mixer that connects to a water supply pipe and that allows mixing of the minerals from the mineral supply pipe with the filtered water in the water supply pipe, the filtered water pipe, and the mineral supply pipe, a mineral cartridge that connects to the mineral supply pipe and that stores condensed minerals, and a pump that pressurizes the mineral supply pipe or the mineral cartridge to allow discharge of the minerals from the mineral cartridge, the method comprising:

detecting a mineral content and a flow rate of filtered water using a mineral sensor and a flow rate sensor provided in the filtered water pipe;

supplying filtered water to the mineral mixer through the water supply pipe;

adjusting an output voltage of the pump in order to control an amount of minerals that are supplied from the mineral supply pipe to the mineral mixer based on the mineral content and flow rate of the filtered water detected;

operating the pump based on the adjusted output voltage of the pump to discharge a predetermined amount of minerals to the mineral mixer;

mixing the minerals discharged with the filtered water supplied in the mineral mixer to generate mineral water; and discharging the mineral water generated from mixing the minerals discharged with the filtered water supplied in the mineral mixer through a cock, wherein adjusting the output voltage of the pump includes:

selecting one of a plurality of data tables according to the mineral content detected by the mineral sensor, each of the data tables identifying output voltages per flow rates based on a corresponding mineral content range; and selecting the output voltage value of the pump corresponding to the flow rate detected by the flow rate sensor in the selected data table, wherein the mineral sensor is provided downstream of the filter and upstream of the water discharge pipe, wherein the filtered water pipe includes a cold water pipe that diverges from the filtered water pipe to channel cold water that has passed through a cooling unit, and a distribution pipe configured to connect the filtered water pipe with the cold water pipe, and wherein the water discharge pipe is configured to connect to the mineral mixer and configured to selectively discharge filtered water or cold water from the distribution pipe.

11. The method according to claim 10, wherein selecting one of the plurality of data tables based on the mineral content includes selecting one of the data tables having a lower output voltage value as a reference value when the detected mineral content is higher, and wherein selecting an output voltage value of the pump corresponding to the flow rate detected includes selecting a higher output voltage value in the selected table when the detected flow rate is higher.

* * * * *